US012681407B2

(12) United States Patent
Tamagaki et al.

(10) Patent No.: US 12,681,407 B2
(45) Date of Patent: Jul. 14, 2026

(54) IMAGE FORMING APPARATUS

(71) Applicant: CANON KABUSHIKI KAISHA, Tokyo (JP)

(72) Inventors: Kuniaki Tamagaki, Kanagawa (JP); Shuhei Kawasaki, Shizuoka (JP); Takayuki Kanazawa, Kanagawa (JP); Jun Hara, Kanagawa (JP); Tsubasa Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/680,124

(22) Filed: May 31, 2024

(65) Prior Publication Data

US 2024/0419097 A1 Dec. 19, 2024

(30) Foreign Application Priority Data

Jun. 15, 2023 (JP) ................................ 2023-098508

(51) Int. Cl.
*G03G 15/08* (2006.01)
*G03G 15/06* (2006.01)

(52) U.S. Cl.
CPC ....... *G03G 15/065* (2013.01); *G03G 15/0808* (2013.01); *G03G 2215/0634* (2013.01)

(58) Field of Classification Search
None
See application file for complete search history.

(56) References Cited

U.S. PATENT DOCUMENTS 5,324,884 A * 6/1994 Honda ............... G03G 15/0806 399/279
6,473,194 B1 * 10/2002 Sakai ..................... G03G 21/04 358/1.17
7,885,564 B2 2/2011 Handa et al.
10,444,658 B2 10/2019 Noguchi et al.
2002/0001094 A1 * 1/2002 Yoshida ................... H04N 1/56 358/1.9
2003/0049039 A1 * 3/2003 Suzuki ............... G03G 15/5058 399/49

(Continued)

FOREIGN PATENT DOCUMENTS

JP 2009-037217 A 2/2009
JP 5093143 B2 12/2012

(Continued)

*Primary Examiner* — Sevan A Aydin
(74) *Attorney, Agent, or Firm* — Venable LLP

(57) ABSTRACT

An image forming apparatus includes a developer bearing member that transports developer to an electrostatic latent image formed on an image bearing member; a supply roller, including a foam elastic member, that supplies the developer to the developer bearing member; a power source device that applies a developing voltage to the developer bearing member and applies a supply voltage to the supply roller; a power source control unit that controls supply of the developer from the supply roller to the developer bearing member by controlling the developing voltage and the supply voltage; and an image control unit that controls formation of the electrostatic latent image based on image information. The image control unit controls, based on a predetermined value, a change amount of the supply voltage in a period during which image formation is performed.

5 Claims, 14 Drawing Sheets

(56) References Cited

U.S. PATENT DOCUMENTS

| | | | | |
|---|---|---|---|---|
| 2006/0078343 | A1* | 4/2006 | Shin | G03G 15/105<br>399/57 |
| 2007/0164558 | A1* | 7/2007 | Wicker | G03G 21/046<br>283/94 |
| 2008/0080884 | A1* | 4/2008 | Yamane | G03G 15/065<br>399/56 |
| 2008/0260401 | A1* | 10/2008 | Shimazaki | G03G 15/1675<br>399/66 |
| 2015/0261123 | A1* | 9/2015 | Mitsui | G03G 15/0808<br>399/285 |
| 2016/0259265 | A1* | 9/2016 | Sugano | G03G 15/065 |
| 2017/0277067 | A1* | 9/2017 | Noguchi | G03G 15/065 |
| 2018/0292773 | A1* | 10/2018 | Kihara | G03G 15/50 |

FOREIGN PATENT DOCUMENTS

| | | | |
|---|---|---|---|
| JP | 2016-130827 | A | 7/2016 |
| JP | 2017-173462 | A | 9/2017 |

* cited by examiner

IMAGE FORMING APPARATUS

BACKGROUND OF THE INVENTION

Field of the Invention

The present invention relates to an image forming apparatus.

Description of the Related Art

In electrophotographic image forming apparatuses such as laser printers, copiers, and fax machines, the surface of a photosensitive drum is uniformly charged by a charging means, and the charged photosensitive drum surface is exposed to light by a light exposure means to form an electrostatic latent image. This electrostatic latent image is then developed by a developing means having a developer bearing member to form a toner image using developer (hereinafter referred to as toner). Then, this toner image is transferred onto a recording material by a transferring means. Thereafter, the toner image is fixed onto the recording material by a fixing means and output as printed material.

Here, in the developing step, it is essential to form a uniform toner layer on the surface of the developer bearing member in order to improve the image quality represented by the color tone, clarity, and the like of the printed material. In order to stably supply toner to the developer bearing member, a supply roller is generally installed. Also, according to Japanese Patent No. 5093143, toner can be supplied more stably by forming a potential difference between the developer bearing member and the supply roller.

SUMMARY OF THE INVENTION

However, with the above-described method, particularly when printing a high-density image on long paper, the toner supply to the developing roller may be insufficient, resulting in a phenomenon in which the density decreases (density thinning) or a phenomenon in which the toner is smeared (smearing). On the other hand, if toner is supplied excessively, the regulating force of a development regulating member such as a blade that regulates the toner amount becomes insufficient, or image defects such as fogging occur in some cases.

The present invention has been made in view of the above points, and an object of the present invention is to provide a technique for suitably supplying toner to a developer bearing member using a supply roller in an image forming apparatus.

The present invention provides an image forming apparatus, comprising:

an image bearing member;

a developer bearing member configured to transport developer to an electrostatic latent image formed on the image bearing member;

a supply roller including a foam elastic member configured to come into contact with the developer bearing member to supply the developer to a surface of the developer bearing member;

a power source device configured to apply a developing voltage to the developer bearing member and apply a supply voltage to the supply roller;

a power source control unit configured to control supply of the developer from the supply roller to the developer bearing member by controlling the developing voltage and the supply voltage; and an image control unit configured to control formation of the electrostatic latent image on the surface of the image bearing member based on image information, wherein the image control unit acquires a first value, which is a value obtained based on the image information, and controls, based on the first value, a change amount of the supply voltage in a period during in which image formation is performed, and the power source control unit controls a change amount of the supply voltage per time.

According to the present invention, it is possible to provide a technique for suitably supplying toner to a developer bearing member using a supply roller in an image forming apparatus.

Further features of the present invention will become apparent from the following description of exemplary embodiments with reference to the attached drawings.

DESCRIPTION OF THE EMBODIMENTS

Hereinafter, preferred embodiments of the present invention will be described in detail by way of example with reference to the drawings. However, unless otherwise specified, the scope of the present invention is not intended to be limited to only the dimensions, materials, shapes, relative arrangements, and the like of the constituent components described in this embodiment. Also, the materials, shapes, and the like of the members that have been described once in the following description are the same in the later description as in the first description, unless otherwise specified. For configurations and steps that are not particularly illustrated or described, known or publicly-known techniques in the technical field can be applied. Also, redundant description is omitted in some cases.

Example 1

Overall Configuration of Image Forming Apparatus

Figure 1:
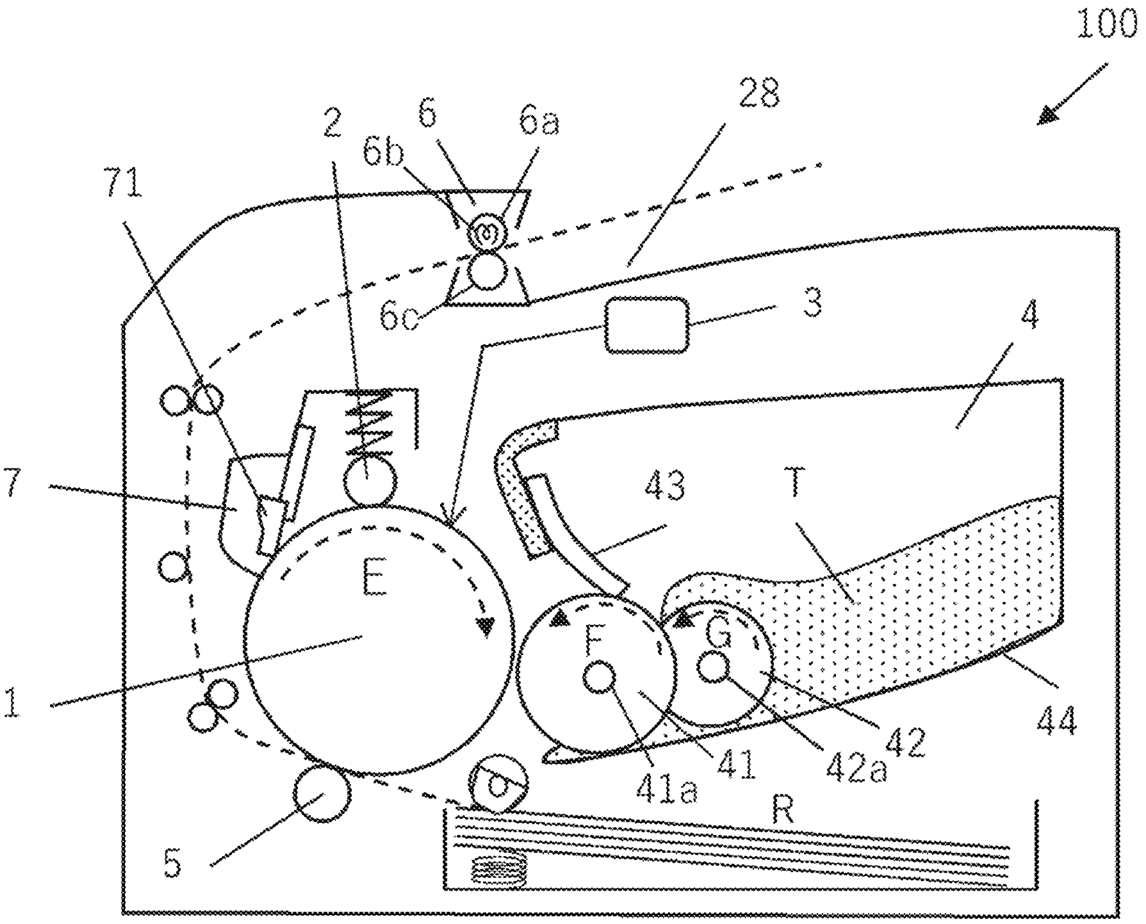
FIG. 1 is a schematic diagram showing an overall image of an image forming apparatus in Example 1.

The overall configuration of the image forming apparatus will be described with reference to FIG. 1. FIG. 1 is a cross-sectional view of a schematic configuration of an image forming apparatus according to the present invention, and each configuration is shown simply.

The image forming apparatus 100 according to this embodiment is generally provided with a photosensitive drum 1 serving as a photosensitive member, a charging device 2, a light exposure device 3, a developing device 4, a transfer device 5, and a fixing device 6. The charging device 2 charges the surface of the photosensitive drum 1. The light exposure device 3 exposes the charged photosensitive drum 1 to light to form an electrostatic latent image corresponding to image information on the surface thereof. The developing device 4 develops the electrostatic latent image formed on the surface of the photosensitive drum 1 with developer (toner T). The transfer device 5 comes into contact with the photosensitive drum 1 and transfers the toner image onto the recording material R. The fixing device 6 heats and presses the recording material R to fix the toner image onto the recording material.

The photosensitive drum 1 is an image bearing member in which a negatively-charged organic photosensitive member is formed on a cylindrical conductive cylinder at a ground potential. Also, the photosensitive drum 1 has a diameter of 24 mm, and is rotationally driven by a motor in a predetermined direction (clockwise direction in the drawing: arrow E) at a predetermined process speed. A process speed S1 of the photosensitive drum 1 of this embodiment is 130 mm/sec.

The charging device 2 is a charging roller to which a desired charging voltage is applied by a later-described power source device 160. The charging device 2 is a charging device that comes into contact with the rotating photosensitive drum 1 with a predetermined pressure contact force and uniformly charges the surface of the photosensitive drum 1 to a predetermined potential. In this embodiment, the photosensitive drum 1 is negatively charged by the charging device 2.

The light exposure device 3 is a light exposure means that performs light exposure corresponding to image information input from an external device or a reading device. As the light exposure device 3, a laser scanner unit that scans the surface of the photosensitive drum 1 with a semiconductor laser, an LED light exposure device that has an LED array in which a plurality of LEDs are arranged along the longitudinal direction of the photosensitive drum 1, and the like can be used. In this example, a laser scanner unit (hereinafter also referred to as a scanner) was used as the light exposure device 3.

The developing device 4 (developing means) includes a developing roller 41 serving as a developer bearing member that carries developer, a developing container 44 serving as a frame of the developing device 4, a supply roller 42, which is a supply member capable of supplying the developer to the developing roller 41, and a developing blade 43 serving as a regulating member that regulates the amount of developer. The developing roller 41 and the supply roller 42 are supported by the developing container 44 so as to be rotatable about a rotation shaft 41*a*. Also, the developing roller 41 is arranged at the opening of the developing container 44 so as to oppose the photosensitive drum 1. Also, the developing roller 41 of this embodiment has a diameter of 10 mm, and is rotationally driven by a motor in a predetermined direction (in the drawing, counterclockwise direction: arrow F) at a predetermined process speed S2=100 mm/sec. Due to a peripheral speed ratio S1/S2 of the photosensitive drum 1 and the developing roller 41 being equal to 1.3, the distance on the surface of the photosensitive drum 1 corresponding to one circumferential length of the developing roller 41 is $10\pi/1.3 \approx 24.16$ mm.

The supply roller 42 has a configuration in which an open-cell foam elastic member is formed around a metal core 42*a*, and is arranged in contact with the developing roller 41 so as to be able to rotate. The supply roller 42 is rotationally driven in the direction of arrow G by a motor.

The toner T serving as the developer contained in the developing container 44 is applied to the surface of the developing roller 41 by the supply roller 42. A supply voltage is applied to the supply roller 42 by the power source device 160 (power source means). Here, the difference between the potential of the supply roller 42 and the potential of the developing roller 41 is called a supply bias. The developing blade 43 is an elastic member, and is arranged in contact with and elastically bent against the developing roller 41. The toner T carried on the surface of the developing roller 41 by the developing blade 43 has a predetermined layer thickness. The toner T having a predetermined layer thickness is transported to a developing portion (developing region) where the photosensitive drum 1 and the developing roller 41 oppose each other. Note that in the illustrated example, a rotation direction F and a rotation direction G are the same, and the developing roller 41 and the supply roller 42 are in counter contact with each other. Also, a peripheral speed ratio of the supply roller 42 with respect to the developing roller 41 is 90%. However, there is no limitation to this, and the developing roller 41 and the supply roller 42 may also be in contact with each other in different rotation directions. The peripheral speed ratio of the supply roller 42 with respect to the developing roller 41 in this case is, for example, 140%. However, in either case, the peripheral speed ratio is not limited to this, as long as the toner supply can be ensured.

The developing device 4 of this embodiment uses a contact developing method as a developing method. That is, the toner layer carried on the developing roller 41 comes into contact with the photosensitive drum 1 in the developing region. A developing voltage is applied to the developing roller 41 by the power source device 160. Under the developing voltage, the toner T carried on the developing roller 41 is transferred from the developing roller 41 to the drum surface according to the potential on the surface of the photosensitive drum 1, whereby the electrostatic latent image is developed into a toner image.

Note that the image forming apparatus 100 may also be of a multicolor type that can form images using toners T of a plurality of colors (e.g., four colors, namely cyan C, magenta M, yellow Y, and black K). In this case, the image forming apparatus 100 includes an image forming portion that forms an image on the surface of the photosensitive drum 1 using the toner T supplied from the developing device 4, for each of the plurality of colors of toner. In this case, it is also preferable to use an intermediate transfer method in which toner images of a plurality of colors are formed in a superimposed manner on an intermediate transfer belt and then transferred to the recording material R. Also, the image forming apparatus 100 may use a process cartridge method in which the developing device 4, the photosensitive drum 1, the charging device 2, a cleaning device 7, and the like are assembled into a cartridge that is removably attached to the main body of the image forming apparatus.

As an example of the toner T of the present embodiment, a polymerized toner that is produced through a polymerization method, has a spherical particle size of 6 μm, and has a negative polarity as a normal charge polarity can be used. Also, the toner T of this embodiment is a so-called non-magnetic one-component developer that does not contain a magnetic component and is carried on the developing roller 41 mainly by intermolecular force or electrostatic force. In addition to toner particles, the one-component developer may contain additives (e.g., wax and fine silica particles) for adjusting the fluidity and charging performance of the toner T. Also, as the developer, a magnetic one-component developer containing a magnetic component or a two-component developer constituted by a non-magnetic toner T and a magnetic carrier may be used. When using a magnetic developer, a cylindrical developing sleeve with a magnet arranged inside, for example, is used as the developer bearing member.

The transfer device 5 has a transfer roller to which a transfer voltage is applied from the power source device 160. The transfer device 5 is a transfer means for transferring the toner image carried on the photosensitive drum 1 onto the recording material R. The recording material R onto which the toner image has been transferred is transported to the fixing device 6.

The fixing device 6 is a fixing means of a thermal fixing method, for fixing an image by heating and melting the toner T on the recording material R. The fixing device 6 includes a fixing film 6*a*, a fixing heater 6*b* such as a ceramic heater that heats the fixing film, and a pressure roller 6*c* that presses against the fixing film, and a thermistor that measures the temperature of fixing heater 6*b* is provided inside of the fixing film. The recording material R that has passed through the fixing device 6 is discharged to the outside of the image forming apparatus 100 (outside the apparatus) and is stacked on a discharge tray 28 formed at the upper portion of the printer main body.

The cleaning device 7 is a cleaning device that removes toner T that has not been completely transferred by the transfer device and remains on the surface of the photosensitive drum 1. The cleaning device 7 removes the toner T due to having an elastic rubber blade 71 whose distal end is arranged in contact with the photosensitive drum 1 while facing upstream in the rotational direction (arrow E) of the photosensitive drum 1.

Control Method

An image analysis and supply bias control method, which are the features of this embodiment and are executed in the image forming apparatus 100 having the above-described configuration, will be described.

The toner T that is supplied from the supply roller 42 and carried on the surface of the developing roller 41 is regulated by the developing blade 43 so as to have a predetermined layer thickness. Here, if images with a high print percentage, such as those with a high print density or a large print area, are repeatedly printed, toner supply from the supply roller 42 may be temporarily insufficient, resulting in image defects such as blurring. For this reason, there is a need to suppress image defects such as blurring caused by insufficient toner supply.

Figure 2:
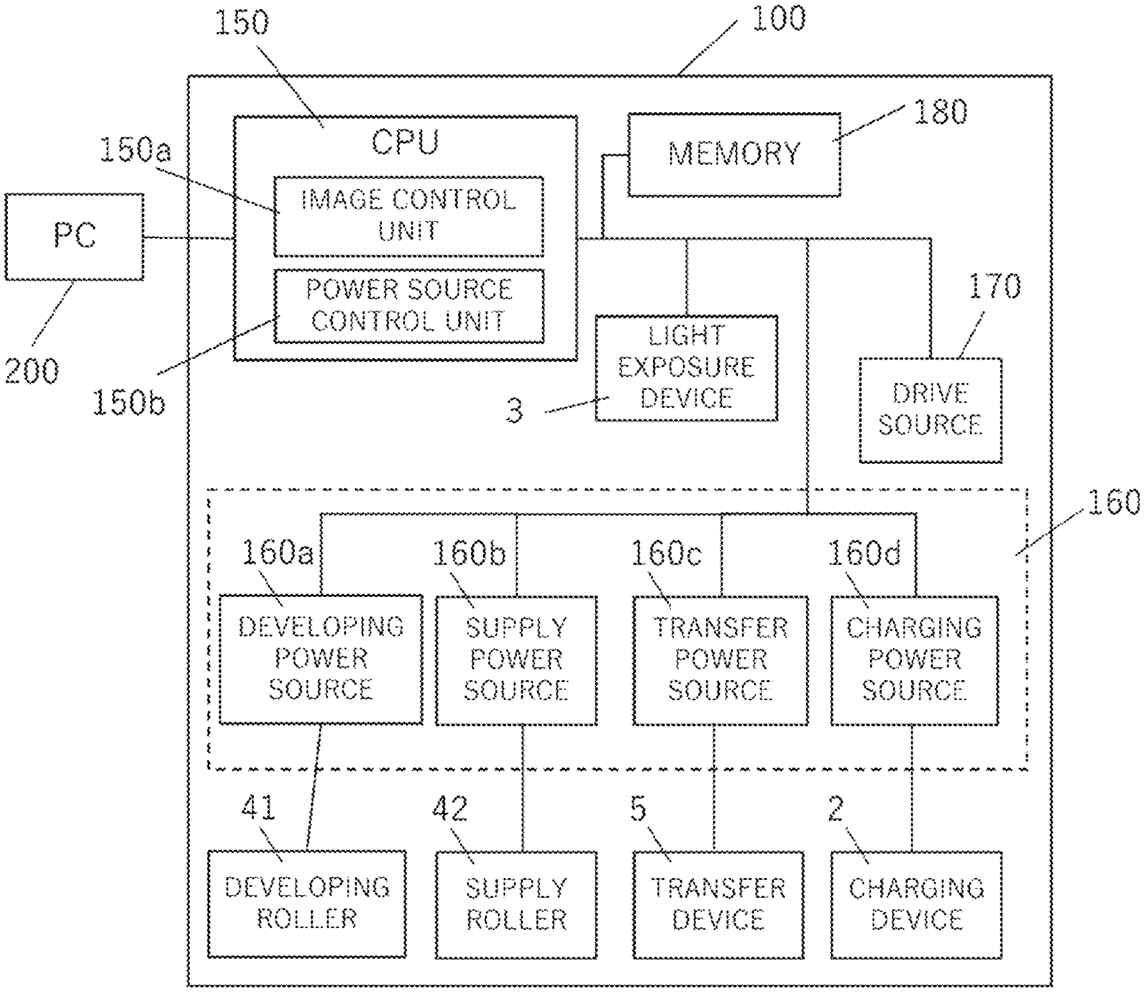
FIG. 2 is a schematic diagram showing a flow of information processing related to image formation in Example 1.

The configuration for image analysis and toner supply determination processing and the flow of information processing in this embodiment will be described with reference to FIG. 2. The image forming apparatus 100 includes a CPU 150 serving as a control unit that operates according to a program or instructions from a user and controls each constituent component of the apparatus. When a print command is issued to the printer from a terminal such as a personal computer 200, the CPU 150 controls the light exposure device 3 serving as a scanner, the power source device 160, a drive source 170, and the like to perform an image forming operation. Note that the CPU 150 may also be thought of as including an image control unit 150*a* and a power source control unit 150*b* serving as functional blocks such as program modules that execute predetermined functions. The image control unit 150*a* performs division of image information, density calculation, print percentage determination, and the like. The power source control unit 150*b* determines control conditions for the power source device 160, and adjusts the developing voltage, the supply voltage, and the supply bias based on the developing voltage and the supply voltage.

Also, the power source device 160 for applying a predetermined voltage to each of the charging device 2, the developing roller 41 and supply roller 42 of the developing device 4, and the transfer device 5 is attached to the image forming apparatus 100. The power source device 160 may also be a single power source device. Also, the power source device may be a collective name for a plurality of power source devices included in the image forming apparatus 100, in which case each of the plurality of power source devices applies a voltage to the corresponding one or more constituent members. The power source device 160 in the example of FIG. 2 includes the development power source 160*a* that applies a voltage to the developing roller 41, a supply power source 160*b* that applies a voltage to the supply roller 42, a transfer power source 160*c* that applies a voltage to the transfer device 5, and a charging power source 160*d* that applies a voltage to the charging device 2. Note that when a single power source device 160 is used, it is conceivable that the power source device 160 serves as both a developing power source and a supply power source.

The image forming apparatus 100 also includes a memory 180 that is constituted by a RAM, a ROM, and the like, which can communicate with the CPU 150 and can hold various types of information such as image information and tables.

Also, the CPU 150 analyzes image information received from the personal computer 200 or read by a reading device, and converts the color space of the original image information to a color space suitable for the image forming apparatus 100. For example, in the case of the image forming apparatus 100 for four-color printing, RGB data is converted to CMYK data. The image expressed in the color space of the image forming apparatus 100 has a correlation with the toner amount of each color used for rendering. In view of this, the CPU 150 can estimate the toner amount to be supplied to the developing roller 41 based on the converted image information. Here, consecutive images with relatively high densities and large areas are referred to as images with a high print percentage, and an image with a relatively low density or a small area is referred to as an image with a low print percentage.

Here, when printing at a high print percentage in the transport direction of the developing roller 41, a large amount of the toner T is used. At this time, if the toner supply amount supplied from the supply roller 42 is not sufficient, toner supply failure will occur, increasing the likelihood that blurring or the like will occur. In view of this, the CPU 150 analyzes the image density in a direction orthogonal to a rotation axis of the developing roller 41, for image information for each color printed in the image forming apparatus 100. Then, based on the analysis results, the CPU 150 detects and determines in advance whether or not there is a high likelihood of a toner supply shortage.

Figure 3:
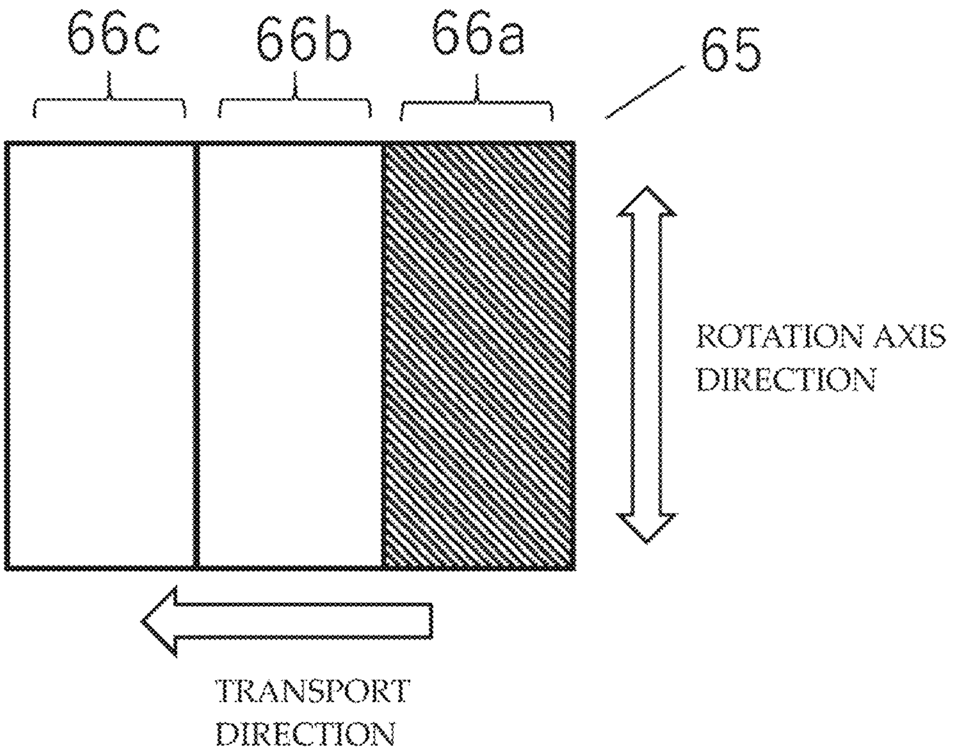
FIG. 3 is a schematic diagram showing a state of image processing in Example 1.

FIG. 3 is a schematic diagram showing the state of analysis in image processing. Image information 65 is two-dimensional data that holds image density information for each color, which is defined by the transport direction of the recording material R and the rotation axis direction of the developing roller 41. In this embodiment, the CPU 150 divides the image information 65 into a plurality of image regions 66*a* to 66*c* in a direction parallel to the rotation axis direction of the developing roller 41. Then, consecutive rendering in a direction orthogonal to the rotation axis direction is analyzed for each image area, and the print percentage is detected. In this example, when a solid black image is considered to have a 100% print percentage and a solid white (no printing) image is considered to have a 0% print percentage, the CPU 150 considers a printing rate of 80% or more to be a high print percentage. However, the threshold value is not limited to this, and may be determined as appropriate. When the CPU 150 calculates the above-described print percentage, it preferably calculates the average print percentage based on image information in the range in which the developing roller 41 makes one revolution.

The determination of whether or not the average print percentage within the circumferential length of the developing roller 41 is greater than or equal to a threshold value (80%) will be described while showing the relationship with the print percentage of the image data. That is, in this embodiment, a case where image data with an average print percentage of 80% or more continues for the circumferential length of the developing roller 41 or longer will be described by way of example. Note that although image data for one revolution of the developing roller 41 is considered as a unit of determination here, there is no limitation to this.

(1) As a first example, it is envisioned that the average print percentage in the first half of the first revolution of the developing roller 41 is 80%, and the average print percentage in the second half of the first revolution is 79%. In this case, considering the image data for one revolution, the average print percentage is 79.5%. Accordingly, the first example is not subject to the control of this embodiment. (2) As a second example, it is envisioned that the average print percentage in the first revolution of the developing roller 41 is 80%, and the average print percentage in the second revolution is 79%. In this case, the state in which the average print percentage is 80% or more continues for the circumferential length or longer, and therefore this case is subject to the control of this embodiment. (3) As a third example, a case is envisioned in which there is consecutive image data in which the average print percentage in the first half of the first revolution of the developing roller 41 is 90% and the average print percentage in the second half of the first revolution is 79%. In this case, considering the image data for one revolution, the average print percentage is 84.5%. Accordingly, this case is subject to the control of this embodiment. (4) As a fourth example, a case is envisioned in which, in the first revolution of the developing roller 41, the average print percentage is 0% (solid white image) for the first ⅕ of a revolution, and the average print percentage for the next ⅘ of a revolution is 100% (solid black image). In this case, when considering image data for one revolution, the average print percentage is 80%. Accordingly, this case is subject to the control of this embodiment.

Figure 4:
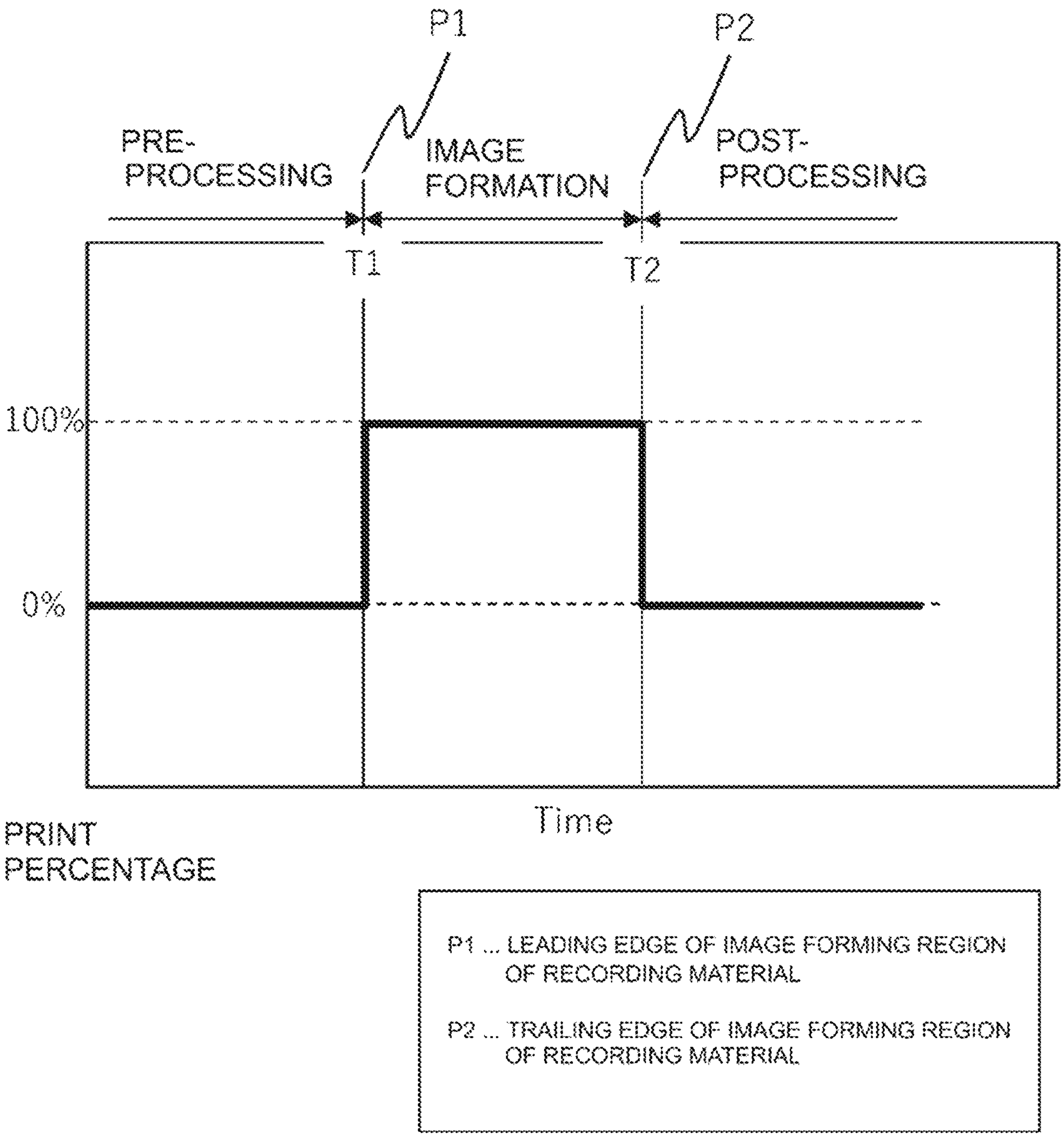
FIG. 4 is a schematic diagram showing a print percentage of a rendered image in a comparative example and Example 1.
Figure 7:
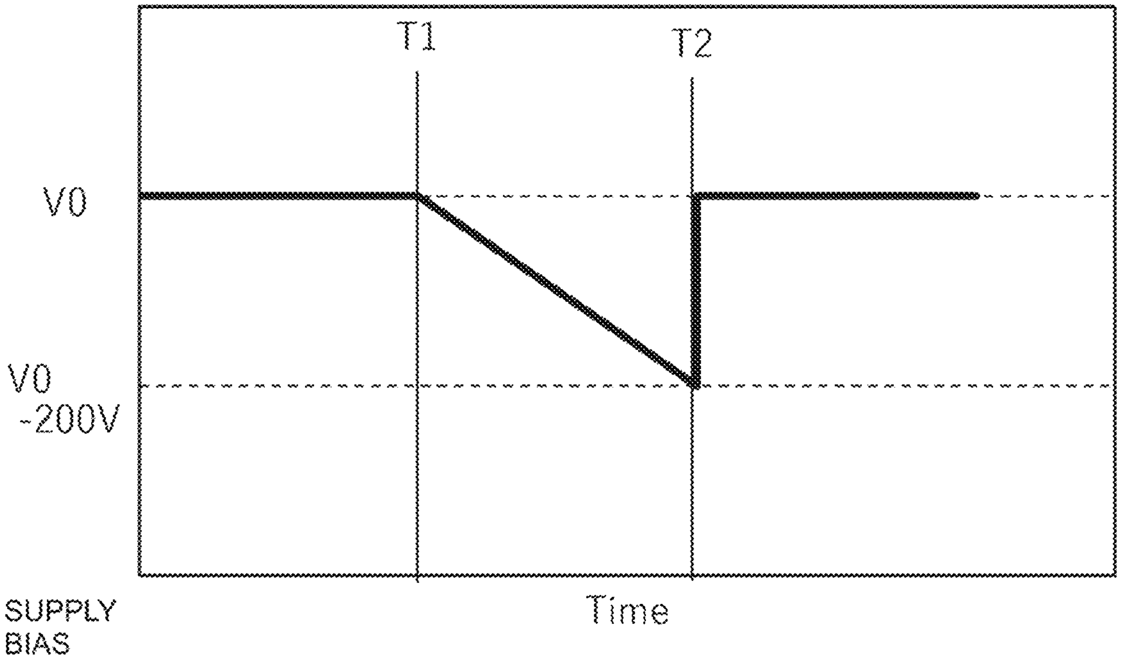
FIG. 7 is a schematic diagram showing the supply bias in Example 1.
Figure 8:
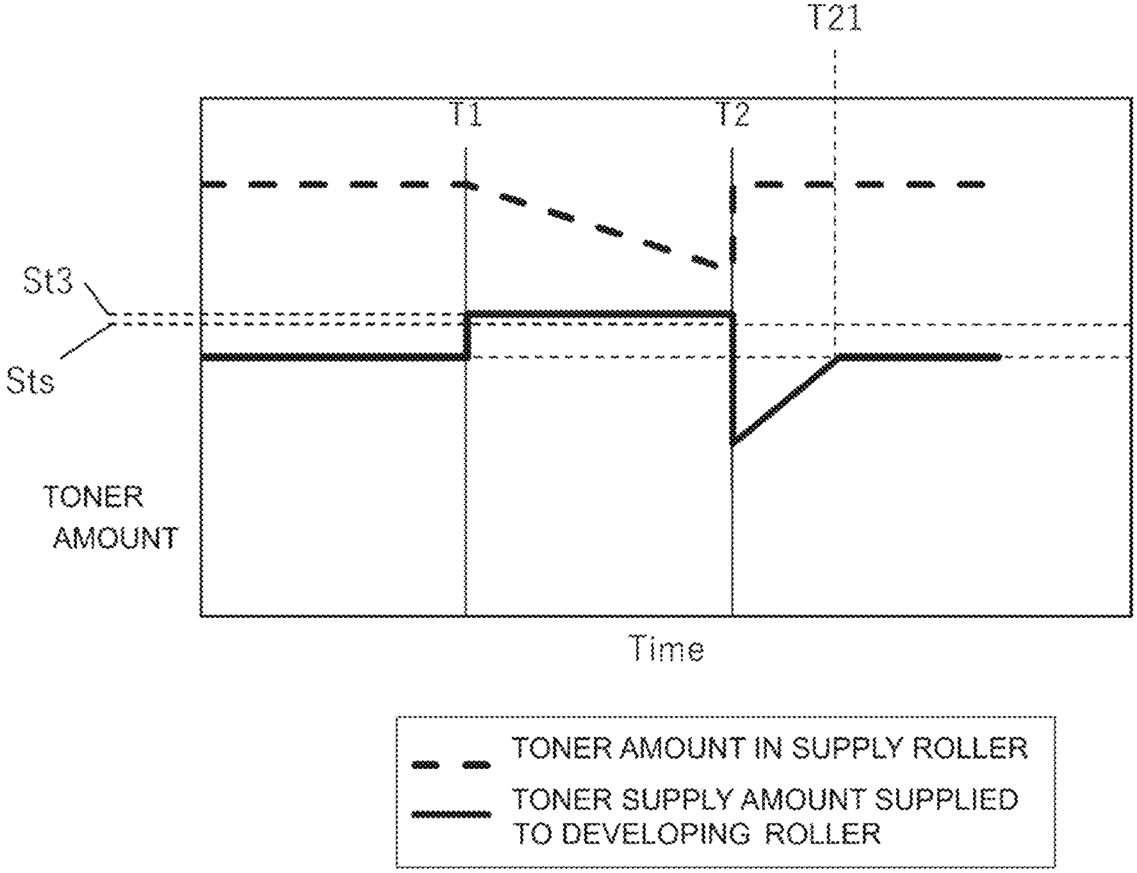
FIG. 8 is a schematic diagram showing the toner amount in the supply roller and the toner supply amount supplied to the developing roller in Example 1.

In FIG. 4, time is indicated on the horizontal axis and print percentage is indicated on the vertical axis, and the change in print percentage over time when rendering is performed with a print percentage of 100% is indicated in section T1-T2. In such a case, a comparison will be made between the comparative examples (FIGS. 5 and 6) and the examples (FIGS. 7 and 8). Here, time T1 is the timing on the photosensitive drum 1 corresponding to the leading edge of the image forming region on the recording material R excluding blank spaces and the like. Time T2 is the timing on the photosensitive drum 1 corresponding to the trailing edge of the image forming region on the recording material R. In this embodiment, the section before time T1 is called a pre-processing section, the section T1-T2 is called an image forming section, and the section after time T2 is called a post-processing section.

Figure 5:
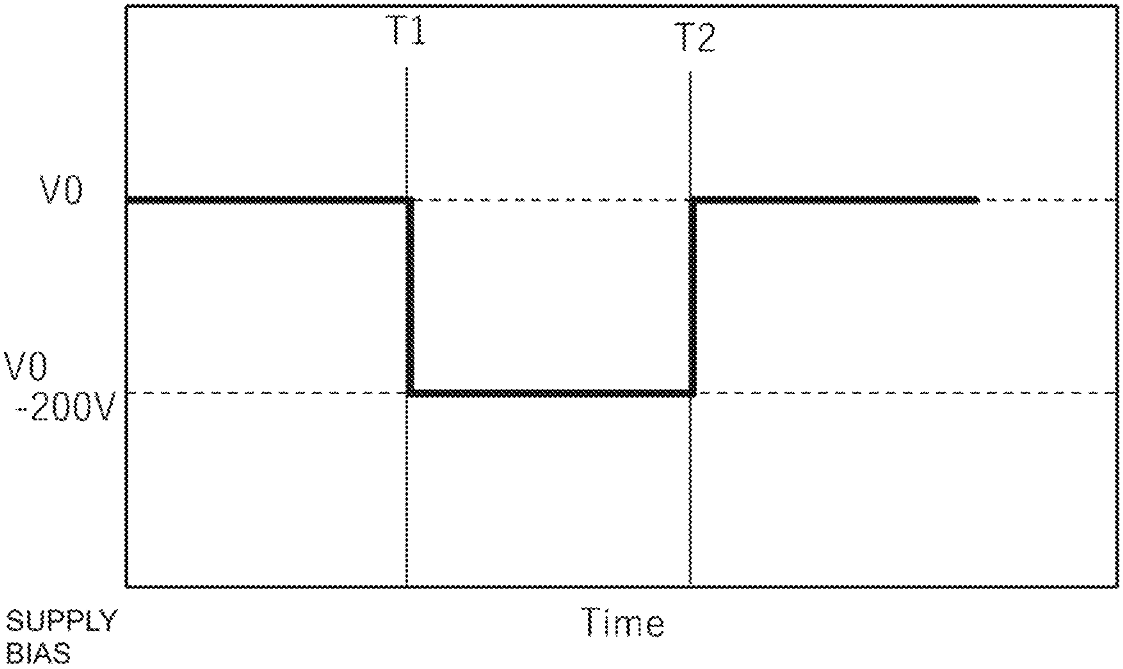
FIG. 5 is a schematic diagram showing a supply bias in a comparative example.

FIG. 5 shows supply bias control in a comparative example. In the pre-processing section, the supply bias is V0. At time T1, the CPU 150 instantaneously changes the supply bias from V0 to V0−200V in the direction of the same polarity as the normal charging polarity of the toner T (negative polarity in this embodiment). During the image forming period, that is, from time T1 to time T2, the supply bias V0−200V is maintained. At time T2, the bias is instantaneously changed in the direction of the polarity different from that of the toner T. Here, the original supply bias V0 is returned to.

Figure 6:
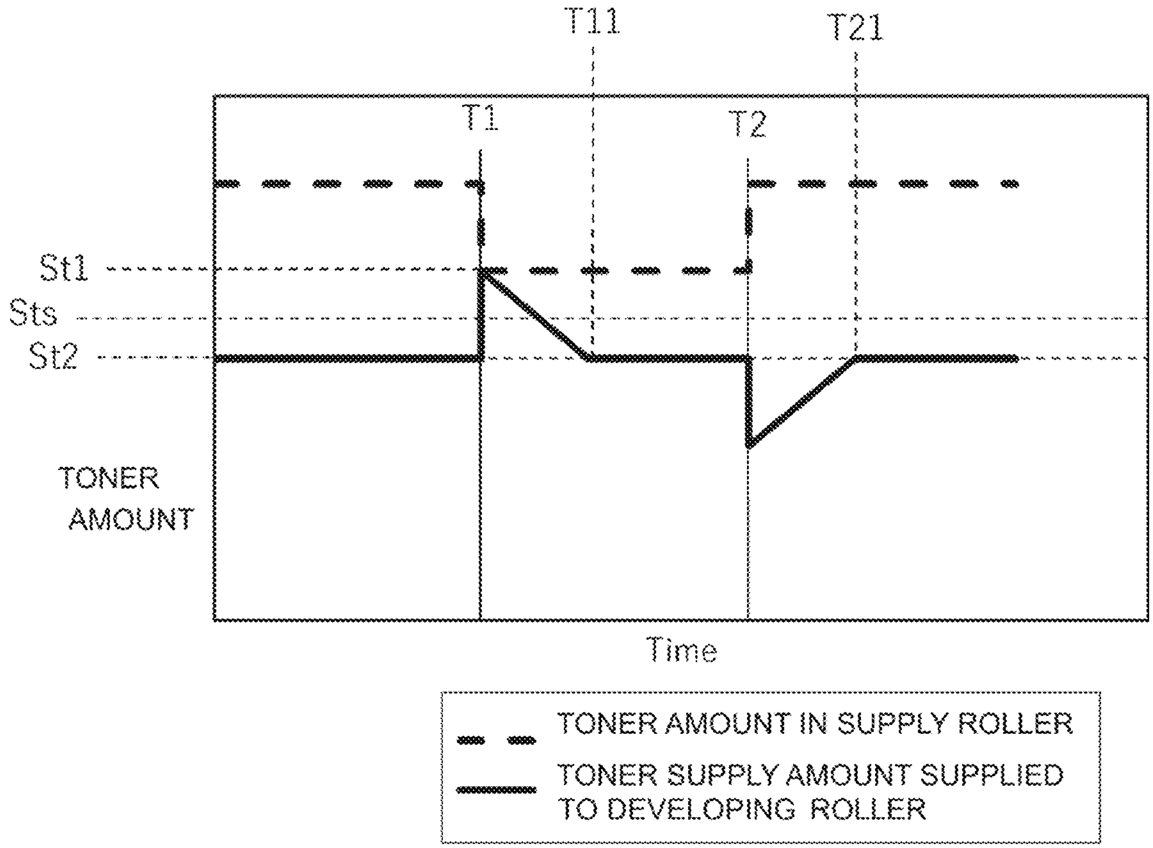
FIG. 6 is a schematic diagram showing a toner amount in a supply roller and a toner supply amount supplied to a developing roller in a comparative example.

In FIG. 6, the horizontal axis indicates time and the vertical axis indicates the toner supply amount, the toner amount in the supply roller 42 in the comparative example is indicated by a broken line, and the toner supply amount to the developing roller 41 is indicated by a solid line. In the pre-processing section, the toner supply amount is a constant toner supply amount according to the supply bias V0. When the supply bias is changed in the direction of the same polarity as the toner T at time T1, the toner amount in the supply roller 42 decreases, and the toner T is supplied from inside the foam elastic member of the supply roller 42 to the surface of the developing roller 41. Conversely, when the supply bias is changed in the direction of the polarity different from that of the toner T at time T2, the toner amount in the supply roller 42 increases, and the toner T is accumulated in the foam elastic member of the supply roller 42.

Here, as time elapses from the time when the bias is changed (time T1), the toner amount in the supply roller 42 balances with the electrostatic potential (time T11). As a result, the flow of toner T from the supply roller 42 becomes steady, and the increase in the toner supply amount supplied to the developing roller 41 due to the supply bias disappears (time T11). That is, in the case of the comparative example, since the toner supply amount decreases as time elapses from time T1, there is a high likelihood that a toner supply shortage will occur, and image defects such as blurring are likely to occur. In the illustrated example, the toner supply amount St1 is sufficient at time T1, but the supply amount gradually decreases and falls below a toner supply amount Sts required for a high print image at a certain timing. Thereafter, the supply amount further decreases and becomes steady at an insufficient toner supply amount St2.

FIG. 7 shows supply bias control in this embodiment. In this embodiment, the supply bias is gradually changed in the direction of the same polarity as the toner T (negative polarity in this embodiment) in the image forming section T1-T2. In FIG. 8, the toner amount in the supply roller 42 of this embodiment is indicated by a broken line, and the toner supply amount supplied to the developing roller 41 is indicated by a solid line. In this embodiment, as the supply bias gradually changes, the toner amount in the supply roller 42 also continues to decrease gradually. For this reason, the toner T continues to be supplied from the supply roller 42 to the developing roller 41. That is, in this embodiment, the toner supply amount supplied to the developing roller 41 is maintained throughout the image forming section T1-T2, and therefore the likelihood of insufficient toner supply occurring is reduced.

The toner supply amount St3 supplied to the developing roller 41 in the image forming section T1-T2 in FIG. 8 according to this embodiment is a stable value and exceeds the toner supply amount Sts required for a high print image. For this reason, even under conditions where high print images are consecutive, the likelihood that image defects such as blurring will occur is reduced.

Note that in FIG. 7, the supply bias was changed so that the slope was constant, but the method for changing the supply bias is not limited to this, as long as the toner required for a high print image can be supplied. For example, in the section T1-T2 of FIG. 7, the supply bias may also be reduced in a stepwise manner.

Also, after time T2, post-processing operations after the end of image formation are shown. By returning the supply bias to the value before time T1 at time T2, the supply roller 42 can be replenished with the toner T.

On the other hand, if excessive toner is supplied to a region where the toner T is not used, such as a white background area, the developing blade 43 may not be able to regulate the toner layer thickness to an appropriate thickness. In this case, image defects such as "fogging" occur, in which the toner T is developed on the white background. In view of this, it is necessary to determine whether the toner T is being supplied excessively and to appropriately control the supply bias.

Figure 9:
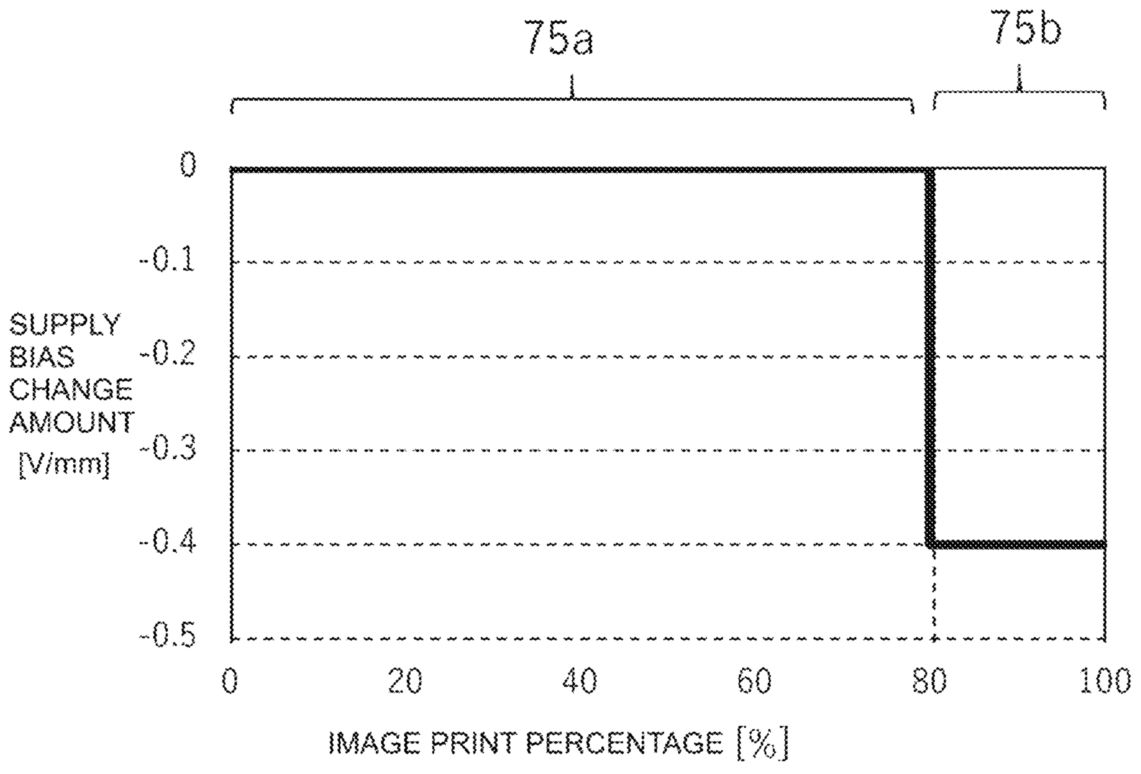
FIG. 9 is a diagram showing a relationship between the print percentage and a change amount of the supply bias in Example 1.

FIG. 9 shows the relationship between the print percentage and the change amount of the supply bias (V/mm) in the control of this embodiment. In the control of this embodiment, in order to supply the toner T for a high print image, in an image region determined as being a high print image, the supply bias is changed by −0.4 V/mm with respect to the length in the rotational direction of the developing roller 41 of the image region (reference sign 75*b*). On the other hand, in a region determined as not being a high print image, the supply bias is controlled to be constant (here, 0.0 V/mm, reference sign 75*a*). Here, in this embodiment, the change amount of the supply bias is a negative value, but it may take a positive value as long as the toner T is in the direction of being supplied to the developing roller 41.

Also, the supply roller 42 of this embodiment has a configuration in which an open-cell foam elastic member rotates while being pressed by the developing roller 41. For this reason, it is compressed upstream of the contact portion and expanded downstream of the contact portion. This change in the state of compression and expansion prompts replacement of the toner T in the foam elastic member of the supply roller 42, and smooths changes in the toner amount caused by the supply bias.

Processing Flow

Figure 10:
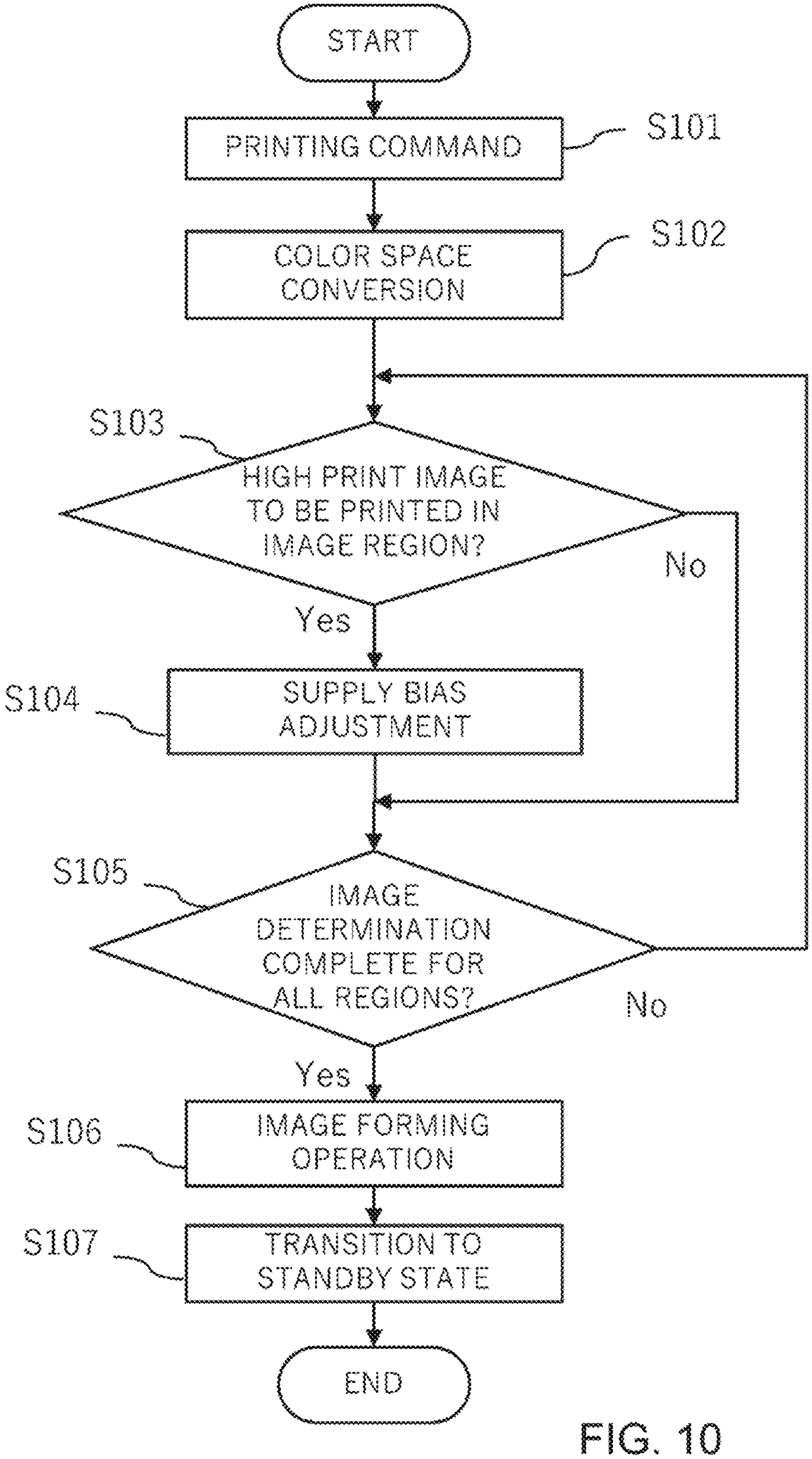
FIG. 10 is a flowchart of an image forming operation accompanying supply bias control in Example 1.

Specific control in this embodiment will be described with reference to the flow in FIG. 10. (Step S101) A print command is issued to the image forming apparatus 100 from a terminal such as the personal computer 200.

(Step S102) The CPU 150 converts the image information 65 to a color space for the image forming apparatus 100. For example, an RGB system is converted to a CMYK system suitable for handling by the image forming apparatus 100.

(Step S103) The CPU 150 determines whether or not a high print image is to be printed within each image region. First, the CPU 150 divides the image information 65 into a plurality of image regions 66. Then, in each image region 66, density information for each color is acquired. Then, for each divided image region 66 and for each color, it is determined whether or not a high print image that would result in insufficient toner supply will be printed in the direction parallel to the rotation axis of the developing roller 41.

(Step S104) The CPU 150 determines the supply bias and the change amount thereof for the image region determined as being a high print image. The change amount of the supply bias at this time is determined based on the print percentage with reference to FIG. 9.

(Step S105) The CPU 150 determines whether the determination of high print images has been performed for all image regions of the image. If there is a region that has not been subjected to determination yet, the processing returns to step S103 and continues. On the other hand, when the determination is performed for all image regions, the processing moves to step S106.

(Step S106) The image forming apparatus 100 performs an actual image forming operation based on the determined supply bias. (Step S107) After image formation is complete, a standby state is transitioned to.

By doing the above, a sufficient amount of toner T can be supplied even when printing a high print image, and therefore image defects such as blurring will not occur. Also, even when printing a low print image, excessive toner T is not supplied, and therefore fogging can be suppressed.

Here, the method of this example is applicable even if the image forming apparatus 100 is a monochrome printer that can render only monochrome images, or a full-color printer such as a CMYK four-color printer.

Example 2

Next, Example 2 will be described. Configurations that are the same as those as in Example 1 described above are denoted by the same reference numerals, and detailed description thereof is omitted.

In Example 1 above, a case where high print images are consecutive was considered. In this example, a case will be considered in which a low print image such as a halftone image is printed after a high print image in a direction orthogonal to the rotation axis of the developing roller 41. Note that here, an image that has a lower print percentage than a high print image and is not a white image (no printing) is referred to as a low print image. Comparing this case with a case where a high print image is not printed before a low print image, it is found that because the amount of toner T used on the surface of the developing roller 41 in the high print image is large, the toner amount immediately before the supply roller 42 supplies toner for the low print image is small. For this reason, even after the toner T is supplied by the supply roller 42, the thickness of the toner layer on the developing roller 41 tends to decrease. As a result, depending on the control of the supply bias, the density of the low print image may be low.

In view of this, in this embodiment, a control method for supplying sufficient toner T to the developing roller 41 even when printing a large number of low print images will be described. A method will be described in which image defects in a low print image are suppressed, even when a low print section is printed after a high print section, as is typical.

Figure 11:
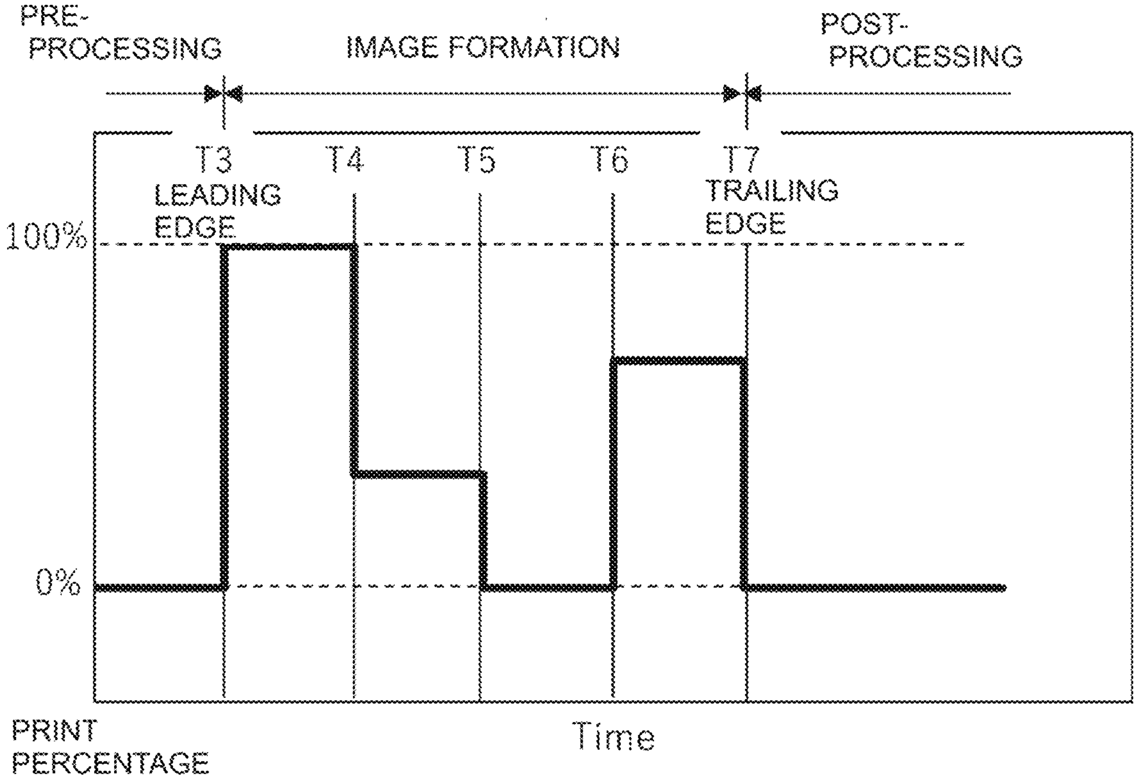
FIG. 11 is a schematic diagram showing a print percentage of a rendered image in Example 2.

In FIG. 11, the horizontal axis indicates time and the vertical axis indicates print percentage. In the image formation section (T3-T7), section T3-T4 has a high print percentage, section T4-T5 has a low print percentage, section T5-T6 has no image (white image), and section T6-T7 has a medium print percentage. Also, time T3 is a timing at the photosensitive drum 1 corresponding to the leading edge of the recording material R, and time T7 is a timing at the photosensitive drum 1 corresponding to the trailing edge of the recording material R. In this embodiment, the operation before time T3 is called a pre-processing operation, the operation in the interval T3-T7 is called an image forming operation, and the operation after time T7 is called a post-processing operation.

Figure 12:
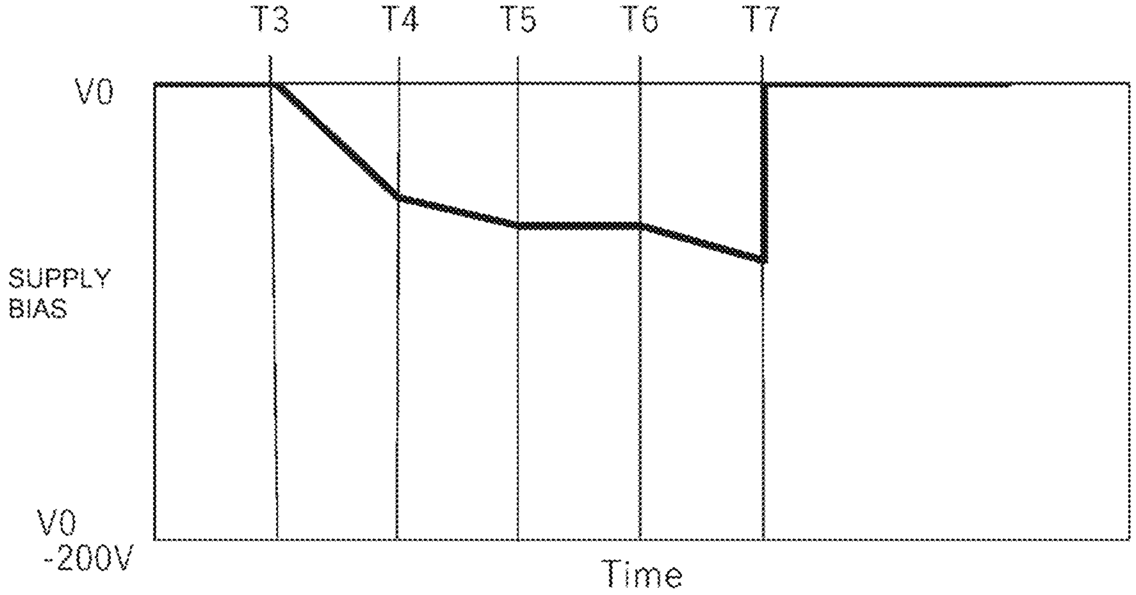
FIG. 12 is a schematic diagram showing a supply bias in Example 2.
Figure 13:
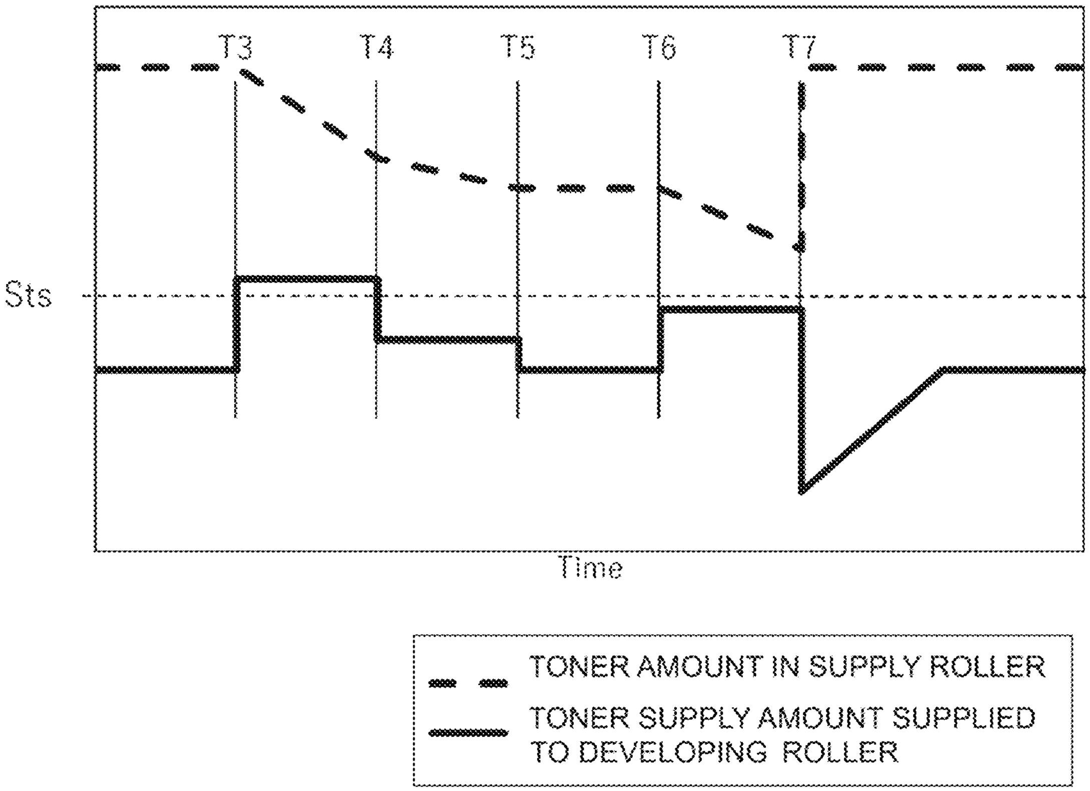
FIG. 13 is a schematic diagram showing a toner amount in a supply roller and a toner supply amount supplied to a developing roller in Example 2.

FIG. 12 shows change over time in the supply bias in this example. FIG. 13 shows the change over time in the toner amount, where the solid line indicates the toner supply amount supplied to the developing roller 41 and the broken line indicates the toner amount in the supply roller 42. The CPU 150 controls the supply bias such that the necessary toner amount is supplied to the developing roller 41 according to the print percentage in each section.

First, in the high print section T3-T4, control is performed such that the supply bias gradually decreases. The gradient of the supply bias at this time may also be controlled according to FIG. 9, for example, as in Example 1. With such supply bias control, as shown in FIG. 13, the toner supply amount supplied to the developing roller 41 exceeds the required toner supply amount Sts for a high print image in the entire section T3-T4. Subsequently, the supply bias is controlled to gradually decrease in the low print section T4-T5 as well, but the slope of the decrease is gentler than in the section T3-T4. As a result, as shown in FIG. 13, stable toner supply is performed for low print images. In this manner, in this example, even when a low print image follows a high print image, it is possible to supply the required amount of toner.

Figure 14:
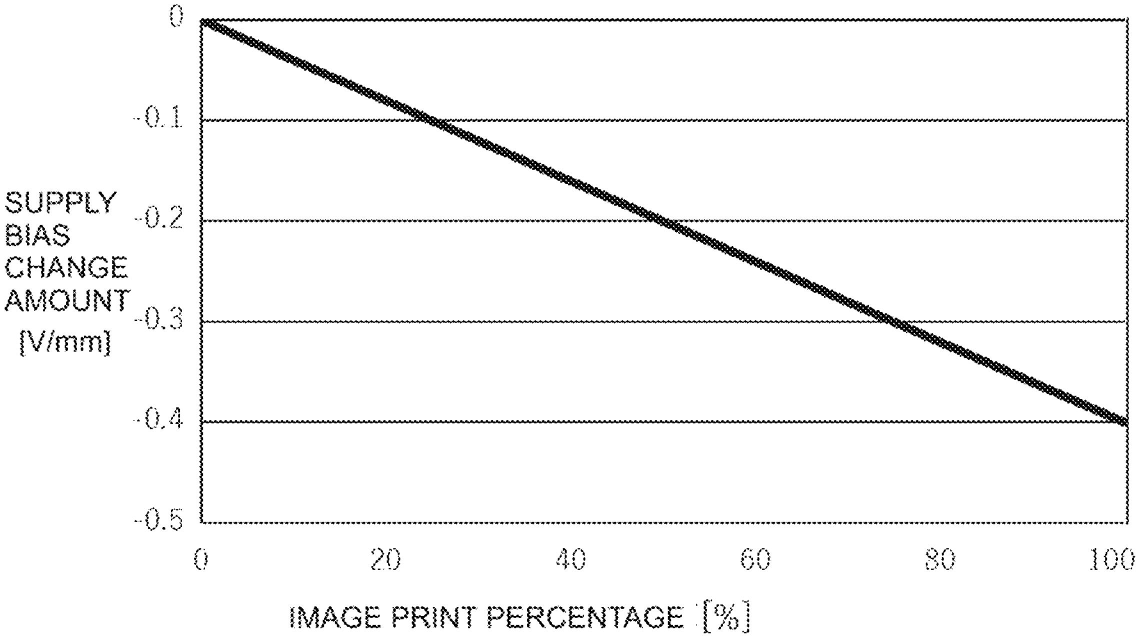
FIG. 14 is a diagram showing a relationship between a print percentage and a change amount of the supply bias in Example 2.

FIG. 14 shows the relationship between the print percentage and the change amount of the supply bias in this example. When the ratio of the toner amount used at any print percentage to the toner amount used to develop the entire toner layer on the surface of the developing roller 41 is denoted by a, the supply bias is changed by the change amount −ax0.4 (V/mm) with respect to the length in the rotational direction of the developing roller 41. Also, since the change amount of the supply bias always has a negative (or positive) value in the image forming section, it has the characteristic of being monotonic (monotonically decreasing or monotonically increasing) with respect to the image forming distance, that is, the operation time.

Here, the change amount of the supply bias (i.e., the gradient of the supply bias) may be expressed as the change amount of the supply bias per time, or may be expressed as the change amount of the supply bias per distance in the direction orthogonal to the rotation axis of the developing roller (the transport direction of the recording material R). That is, it is sufficient to be able to express the relationship between the position and the change amount of image information in the transport direction. For example, in FIG. 12, when the supply bias at any time t1 is V(t1), dV/dt, which is obtained by taking a t differentiation, may be used as the change amount of the supply bias.

By doing the above, even when a low print image is printed after a high print image, it is possible to suppress blurring of the high print image without causing density thinning.

As described above, in the examples of the present invention, the print percentage of the image to be formed based on the image information was acquired through a method such as calculation based on the image information or reading from memory, and was used to control the change amount, such as slope control of the supply bias. However, the supply bias control of the present invention is not limited to the print percentage, and can also be implemented using other values related to the amount of toner to be supplied. For example, based on the image information, the CPU 150 can acquire the toner amount in a predetermined range, such as during one revolution of the developing roller 41, in a form such as an absolute value of weight or a relative value unique to the apparatus. Alternatively, when using the absolute value of the weight, actual measurement may also be performed. That is, the present invention can also be thought of as controlling the change amount of the supply bias according to a first value obtained based on image information. In this case, the print percentage may be used as the first value, or the calculated value or measured value of the amount of toner used may be used as described above.

As described above, in the examples of the present invention, the print percentage (e.g., the average print percentage during one revolution of the developing roller 41) is calculated based on the image information, and is used to control the change amount of the supply bias by the CPU 150. Here, the image forming apparatus 100 includes a configuration for detecting the density of the actually-printed toner image, and may be used to correct the applied voltage based on the image data. In the case of a monochrome printer as shown in FIG. 1, as the target for density detection, a density detection mechanism for a patch of a toner image formed on the surface of the photosensitive drum 1 may be provided inside the apparatus main body, or the density of the toner image transferred to the recording material may be detected. Also, when a plurality of photosensitive drums corresponding to a plurality of colors are included and each color toner image is transferred in a superimposed manner to an intermediate transfer member such as an intermediate transfer belt, a toner image density detection mechanism formed on the surface of the intermediate transfer member may be provided inside the apparatus main body, and the density of the toner image transferred onto the recording material may be detected. The CPU 150 adjusts apparatus control values (e.g., the voltage applied from the power source, etc.) based on the difference between the density of the toner image assumed to be formed based on image information and the actual density detected by the density detection mechanism, and thereby perform adjustment such that the intended printing is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-098508, filed on Jun. 15, 2023, which is hereby incorporated by reference herein in its entirety.

What is claimed is:

1. An image forming apparatus, comprising:

an image bearing member;

a developer bearing member configured to transport developer to an electrostatic latent image formed on the image bearing member based on image data;

a supply roller including a foam elastic member configured to come into contact with the developer bearing member to supply, to a surface of the developer bearing member, the developer charged to a normal charging polarity;

a power source device configured to apply a developing voltage to the developer bearing member and apply a supply voltage to the supply roller;

an acquisition unit configured to acquire, for each of a plurality of regions on the image bearing member in a rotation direction of the image bearing member, information regarding a print-pixel area obtained from the image data; and a control unit configured to control supply of the developer from the supply roller to the developer bearing member by controlling the developing voltage and the supply voltage, wherein the control unit is configured to control an image forming operation in which an image formed of the developer on the surface of the image bearing member is produced and then printed on a recording material, and when executing the image forming operation for one sheet of the recording material, in a case in which, among the plurality of regions on the image bearing member, a second region having a second print-pixel area that is smaller than a first print-pixel area is formed after a first region having the first print-pixel area, the control unit controls the supply voltage so that the supply voltage is continuously increased toward the normal charging polarity from the first region to the second region, and an increase amount per unit length in the rotation direction of the image bearing member of the supply voltage within the first region is greater than an increase amount per unit length in the rotation direction of the image bearing member of the supply voltage within the second region.

2. The image forming apparatus according to claim 1, wherein the acquisition unit acquires an amount of the developer used for forming an image based on the image data when acquiring the information.

3. The image forming apparatus according to claim 1, wherein the control unit controls a change amount of the supply voltage per distance in a direction orthogonal to a rotation axis of the developer bearing member.

4. The image forming apparatus according to claim 1, wherein the control unit performs control such that the supply voltage is changed by a predetermined change amount in a high-print-percentage section in which the print percentage is equal to or greater than a threshold determined through analysis of the image data, and the supply voltage is constant in a low-print-percentage section in which the print percentage is less than the threshold.

5. The image forming apparatus according to claim 1, wherein the control unit performs control such that the higher a print percentage in an image to be formed based on the image data is, the greater the change amount of the supply voltage is.

* * * * *